United States Patent [19]

Lee

[11] Patent Number: 5,416,835
[45] Date of Patent: May 16, 1995

[54] AUTOMATIC SIGNALING-TYPE INDICATOR FOR USE IN SUBSEQUENT INTERACTIVE DIALING

[75] Inventor: Dooyong Lee, West Orange, N.J.
[73] Assignee: AT&T Corp., Murray Hill, N.J.
[21] Appl. No.: 93,378
[22] Filed: Jul. 19, 1993
[51] Int. Cl.⁶ .................. H04M 3/64; H04M 3/42
[52] U.S. Cl. .................. 379/221; 379/201; 379/283; 379/207; 379/230
[58] Field of Search .................. 379/31, 207, 213, 214, 379/220, 221, 229, 230, 235, 243, 244, 265, 266, 281, 282, 283, 353, 280, 284, 286; 370/110.3

[56] References Cited

U.S. PATENT DOCUMENTS

| | | | |
|---|---|---|---|
| 4,460,806 | 7/1984 | Canniff et al. | 379/283 X |
| 4,577,066 | 3/1986 | Bimonte et al. | 379/221 |
| 4,611,096 | 9/1986 | Asmuth et al. | 379/230 X |
| 4,827,500 | 5/1989 | Binkerd et al. | 379/354 X |
| 5,046,088 | 9/1991 | Margulies | 379/265 X |

Primary Examiner—James L. Dwyer
Assistant Examiner—Daniel S. Hunter
Attorney, Agent, or Firm—Gerard A. deBlasi

[57] ABSTRACT

Call setup time is reduced by automatically (1) identifying the type of signaling used by a caller to communicate with a central office, and (2) providing an indication of the signaling type to telephone switches or databases that will participate in routing and processing the telephone call. Dual Tone Multifrequency (DTMF) detectors located at a central office of a local exchange carrier detect whether a caller is using DTMF signaling. The local central office includes this information in a signaling message provided, for example, to interexchange carriers and other service providers which will use DTMF signaling during and after call setup. In this manner, the need to query the caller for this information is eliminated.

18 Claims, 2 Drawing Sheets

AUTOMATIC SIGNALING-TYPE INDICATOR FOR USE IN SUBSEQUENT INTERACTIVE DIALING

TECHNICAL FIELD

The invention relates to techniques for processing telephone calls and, more particularly, to techniques for identifying the type of signaling used to process a particular telephone call.

BACKGROUND OF THE INVENTION

Many businesses use automated call processing services to process telephone calls received from customers. Automated call processing services are useful, for example, to connect a caller to a desired destination or obtain information quickly and easily. The caller typically is provided with an announcement and is requested to enter an appropriate sequence of keystrokes from the telephone keypad to respond to the announcement. For example, a caller who calls a large department store may be given the option of selecting a department from a menu recited over the phone. Dual tone multifrequency (DTMF) signaling enables the caller to use the telephone keypad as an input device to communicate menu selections through the telephone lines. In response to the caller's menu selections, the call is extended to the appropriate department of the department store.

DTMF signaling is required to obtain the full benefit of automated call processing services. However, not all telephone lines are configured to use DTMF signaling to communicate with the local central office. Many telephones use rotary or "dial pulse" signaling to communicate with the local central office. Thus, provisions must be made to accommodate both DTMF and dial pulse calls. Typically, a caller is requested to manually identify the type of signaling that the caller is using, for example, by striking a key on the telephone keypad if the caller has a "Touch-Tone ®" telephone (i.e., a telephone using DTMF signaling) to take advantage of automated call processing features. Callers using dial pulse signaling must wait a predetermined time-out period before being connected to an operator. This identification process produces call setup delays which increase telephone connect charges and may annoy telephone customers.

SUMMARY OF THE INVENTION

Call setup time and caller inconvenience are reduced by automatically identifying the type of signaling used by a caller to place a telephone call through the central office, and automatically providing an indication of the signaling type to telephone switches that will participate in routing and processing the telephone call.

In an exemplary embodiment of the invention, DTMF detectors deployed at the local central office of a local exchange carrier are used to detect automatically whether a caller is using DTMF signaling. The central office then generates an indication of the type of signaling that the caller is using to place the call and sends this indication to other telephone switches in the communications system which participate in the call. The indication may be provided, for example, within a signaling message that the central office transmits to an interexchange telephone switch. Information about the caller's signaling type is then immediately available to other switches within the communications system so that the call can be switched directly to either an operator (for dial pulse signaling calls) or automated call processing equipment (for DTMF signaling calls), thereby eliminating the need to query the caller for this information.

DETAILED DESCRIPTION

The invention will be described, for illustration purposes, in the context of "toll-free" or "800 number" service configured to provide advanced features for routing calls to an 800 number service subscriber (an "800 subscriber"). More particularly, the invention will be described in the context of 800 number calls that are routed in response to selections made by the caller using DTMF signaling. Methods and apparatus for processing 800 number calls are described in greater detail in U.S. Pat. No. 4,191,860, issued to Weber, entitled, "Data Base Communication Call Processing Method," which is hereby incorporated by reference.

Figure 1:
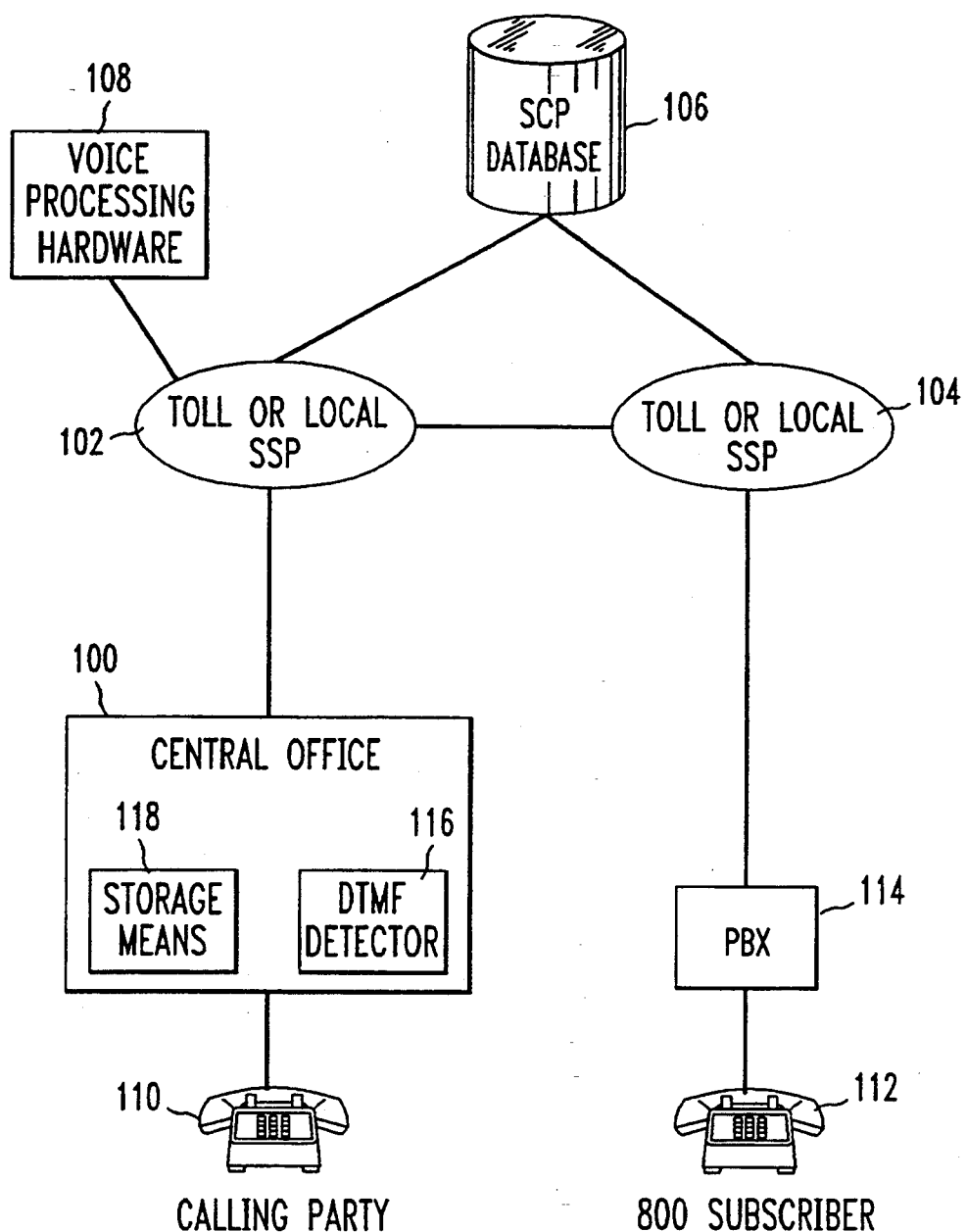
FIG. 1 is a block diagram of a communications system suitable for use with the present invention.

Before describing the novel aspects of the invention, it will be useful to describe a typical communications system. With reference to the drawings, FIG. 1 shows a communications system including a central office 100, service switching points (SSP) 102 and 104, a service control point (SCP) 106, and voice processing hardware 108. A caller places calls from a telephone station 110 to an 800 subscriber at a telephone station 112. Calls placed from telephone station 110 are extended to central office 100. Central office 100 switches the call to SSP 102. Central office 100 communicates with SSP 102 by forming a message, in a conventional manner, which includes information such as the dialed number and optionally the originating number (i.e., the automatic number identifier, or "ANI," of telephone station 110).

SSP 102 accesses SCP 106 to determine how to process the call. SCP 106 determines call handling on the basis of information obtained by SSP 102 from central office 100, or on the basis of other factors, such as the time of day or day of the week. SCP 106 processes this information and returns instructions to SSP 102 for routing the call. SSP 102 then routes the call, for example, to SSP 104. SSP 104 routes the call to a private branch exchange (PBX) 114, which extends the call to the 800 subscriber at telephone station 112. Alternatively, SCP 106 can instruct SSP 102 to send the call to voice processing hardware 108.

Central Office 100 illustratively is a 5ESS ® switch manufactured by American Telephone & Telegraph Co., Inc. (AT&T). SSP 102 and 104 could be either local exchange switches or interexchange switches, and illustratively are 4ESS ™ switches manufactured by AT&T. Although SSP 102 and 104 are shown coupled directly to SCP 106, it is to be understood that the SSPs often are coupled to SCP 106 through other pieces of network equipment. SCP 106 typically is a centralized database which includes a processor together with a database of selected customer information useful in determining how to route or process telephone calls. In the context of 800 number service, SCP 106 stores information required to convert an 800 number into a routing number, e.g., a Plain Ordinary Telephone Service (POTS) number, as well as information for processing advanced 800 number features (such as routing calls in response to Call Prompter). In an exemplary embodiment, SCP 106 includes an INWATS database (IDB) network control point (NCP) manufactured by AT&T, and a Direct Services Dialing (DSD) NCP, both commercially available from AT&T. Voice processing hardware 108 is implemented, for example, using the Conversant® speech processor or the Network Services CompleX® equipment, both commercially available from AT&T. In other exemplary embodiments, the functionality of two or more of SCP 106, voice processing hardware 108, and SSP 102 are implemented within a single switch or network element.

Currently, when a caller calls an 800 subscriber who subscribes to voice processing call routing, the caller at telephone station 110 is prompted to indicate whether the caller is using DTMF signaling to communicate with central office 100. Typically, this is done by pressing "1" on the telephone keypad. If the caller is using dial pulse signaling, the caller is requested to wait for operator assistance. Through this manual and time-consuming process, SCP 106 is able to determine which calls SSP 102 should route to voice processing hardware 108 and which calls SSP 102 should route to an operator (attendant). Requiring a caller to indicate manually the type of signaling the caller is using increases the call setup time, resulting in higher connect charges for the 800 subscriber and inconvenience to the caller.

In accordance with the invention, the delay associated with having the caller manually signal the SSP with information about the signaling type is eliminated by (1) automatically detecting the signaling type at central office 100, and (2) automatically providing an indication of the signaling type to SSP 102. SCP 106 receives the indication of signaling type from SSP 102 together with the other information that the SCP requires to process the call. This enables SCP 106 to cause the call to be routed directly to an operator for dial pulse signaling calls, or to automated call processing equipment for DTMF signaling calls, without querying the caller.

Figure 2:
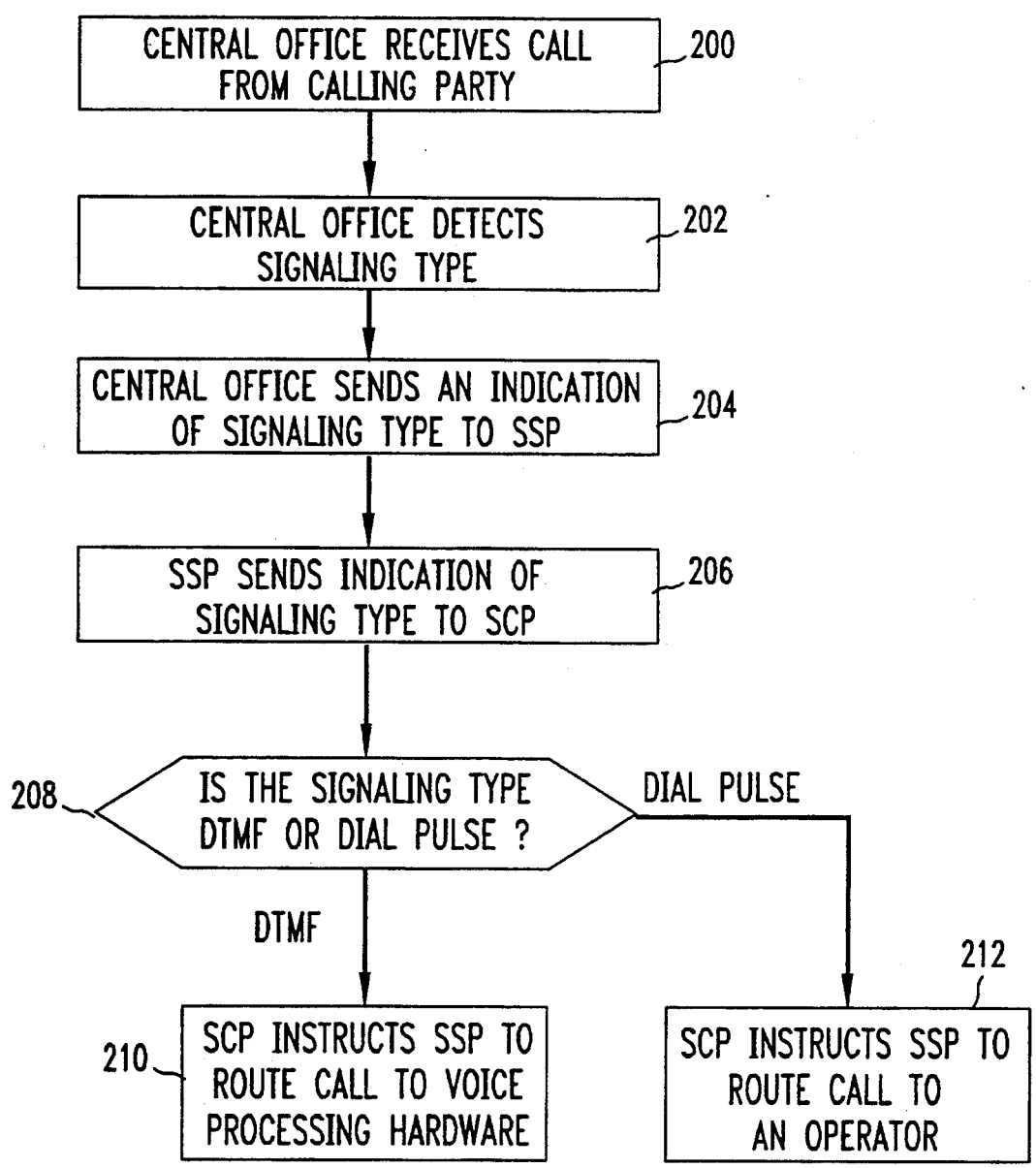
FIG. 2 is a flow chart for processing telephone calls in accordance with the principles of the present invention.

FIG. 2 shows a flowchart which illustrates an exemplary method for processing calls in accordance with the invention. In the first step of the process (step 200), the local central office receives signals and dialed digits indicating the beginning of a call from a caller. The central office detects the signaling type (step 202) using a DTMF detector 116 (FIG. 1) deployed within the central office. DTMF detector 116 is a conventional DTMF detector which collects digits dialed by the caller at telephone station 110. Central office 100 senses, through DTMF detector 116 when the caller first dials a number, that the caller is using DTMF signaling.

Central office 100 sends an indication of signaling type (step 204) to SSP 102. If DTMF detector 116 detected DTMF tones, central office 100 provides an indication that the signaling type is DTMF. If, however, DTMF tones are not detected, central office 100 provides an indication that the signaling type is dial pulse signaling. The indication is sent to SSP 102 using conventional trunk signaling systems. For example, the indication can be provided in the form of a Common Channel Signal Number 7 (CCS7) message. Techniques for transmitting the indication from central office 100 to SSP 102, including forming messages, are well known in the art. Exemplary messaging techniques are disclosed, for example, in U.S. Pat. No. 4,555,594 issued to Friedes et al. on Nov. 26, 1985, entitled "Telephone Interexchange Signaling Protocol," which is hereby incorporated by reference.

Central office 100 is configured to provide the indication of signaling type to SSP 102 for each and every call the central office routes to SSP 102 or selectively on the basis of the call type. For example, central office 100 can be programmed to provide the indication of signaling type only for so-called "special service" calls, such as 700, 800, and 900 calls, or for calling card calls.

SSP 102 then sends an indication of the signaling type to SCP 106 (step 206). SCP 106 processes the call to determine call handling. If the 800 subscriber subscribes to automated call processing features which require DTMF signaling, SCP 106 processes the signaling type information (from the indication it receives from SSP 102) to determine whether the signaling is DTMF or dial pulse (step 208). When the indicated signaling type is DTMF signaling, SCP 106 instructs SSP 102 to handle the call to effect automated voice processing (if appropriate), as shown in step 210. In other words, SSP 102 handles the call as it would have in the prior art had the caller manually indicated that the signaling type is DTMF. When the indicated signaling type is dial pulse signaling, SCP 106 instructs SSP 102 to route the call to an operator (step 212).

In another exemplary embodiment of the invention, central office 100 does not immediately transmit the indication of signaling type to SSP 102, but instead stores this information until the information is requested by SCP 106 (via SSP 102). When configured to operate in the manner described above, central office 100 includes memory, such as storage means 118 of FIG. 1, for storing the indication of signaling type pending a request by SCP 106. In such an embodiment, central office 100 detects whether the caller is using DTMF signaling and stores this information in storage means 118. The central office provides the caller's signaling type information to SSP 102 only in response to a request from SCP 106.

Some local central offices currently in service lack the capability to process DTMF signals. In such cases, the central office is configured, in accordance with another aspect of the invention, to automatically indicate to its associated SSP that the caller is using dial pulse signaling. The central office can be configured to provide this information (1) for each and every call the central office routes to the SSP, (2) selectively on the basis of the call type (e.g., for 800 calls only), or (3) on the basis of a real-time request from an SCP.

Although the invention is described herein in the context of 800 service, it is to be understood that the principles of the invention are equally applicable to direct dial and other forms of service requiring interactive dialing (i.e., dialing interaction between the caller and the network). For example, automatically determining and indicating signaling type in accordance with the invention is useful in processing "special service" calls, such as so-called "900 number" or "premium service" calls. (A premium service call is a call for which the caller typically pays at least a portion of the telephone charges and often an additional premium.) The invention also is applicable to special service calls such as "700 number" calls (calls that are routed according to the call-recipient's instructions), interactive telephone service (e.g., AT&T MultiQuest ® Interacter service and AT&T InfoWorx SM interactive voice service), and to calls charged to credit cards or telephone "calling" cards. In the case of calls placed using telephone calling cards, automatically determining and indicating the caller's signaling type speeds processing of calls made from dial pulse signaling telephones by immediately connecting the caller to an operator for call authorization purposes.

It will be apparent to one skilled in the art that other modifications can be made to the described embodiments without departing from the scope of the invention. For example, although the invention has been described in the context of communications systems which utilize either DTMF or dial pulse signaling, the invention is equally useful for other types of signaling, such as Integrated Services Digital Networks (ISDN) signaling or proprietary line signals (e.g., signals used to communicate with certain PBX systems), that can be converted to DTMF by the local central office or a PBX.

I claim: claims:

1. A method for use in a communications system in which a telephone station communicates with a telephone switch, the method comprising the steps of:
   detecting the type of signaling being used to communicate from the telephone station to the telephone switch; and
   providing to a service switching point that is coupled to the telephone switch an indication of whether said type of signaling is suitable for interactive dialing.

2. The invention of claim 1 wherein the providing step comprises providing an indication of whether the telephone station is communicating with the telephone switch using dual tone multifrequency signaling.

3. The invention of claim 1 wherein the providing step comprises sending automatically the indication for a call that the telephone switch routes to the service switching point.

4. The invention of claim 1 wherein the providing step comprises sending the indication automatically for a call that the telephone switch routes to the service switching point, said indication being sent selectively as a function of call type.

5. The invention of claim 4 wherein the indication is sent for a special service call.

6. The invention of claim 1 wherein the providing step comprises sending the indication in response to a request for the indication from a service control point.

7. The invention of claim 6 wherein the providing step further comprises the step of storing information including said type of signaling at the telephone switch.

8. A method for use in a communications system in which a telephone station communicates with a telephone switch, the method comprising the steps of:
   detecting the type of signaling being used to communicate from the telephone station to the telephone switch; and
   providing to a service switching point that is coupled to the telephone switch an indication of the type of signaling that was detected in said detecting step.

9. A method for use in a communications system in which a telephone station communicates with a telephone switch using a predetermined type of signaling to initiate a telephone call, the method comprising the steps of:
   receiving at a service switching point that is coupled to the telephone switch an indication of whether said type of signaling is suitable for interactive dialing, the indication being automatically generated by the telephone switch after automatic detection by the telephone switch of the type of signaling used to communicate between the telephone station and the telephone switch;
   responding to the indication received at the service switching point to specify instructions for routing the telephone call; and
   routing the telephone call according to the specified routing instructions.

10. The invention of claim 9 wherein the receiving step comprises receiving an indication of whether the telephone station is communicating with the telephone switch using dual tone multifrequency signaling.

11. The invention of claim 9 wherein the responding step comprises determining that the call is to be routed to a particular one of an attendant and an automatic voice response system.

12. The invention of claim 9 wherein the responding step comprises the steps of:
    sending the indication from the service switching point to a service control point;
    processing the telephone call at the service control point to specify the instructions for routing; and
    returning the instructions for routing to the service switching point.

13. The invention of claim 9 wherein the receiving step further comprises receiving the indication for each subsequent call that the telephone switch routes to the service switching point.

14. The invention of claim 9 wherein the receiving step further comprises receiving the indication automatically for subsequent calls that the telephone switch routes to the service switching point, said indication being sent selectively as a function of call type.

15. The invention of claim 14 wherein the indication is sent for special service calls.

16. The invention of claim 9 wherein the receiving step comprises receiving the indication in response to a request for the indication from the service switching point.

17. Apparatus for use in a communications system in which a telephone station communicates with a telephone switch to initiate a telephone call, the apparatus comprising the steps of:
    means for receiving at a service switching point that is coupled to the telephone switch an indication of whether the telephone station is communicating with the telephone switch using dual tone multifrequency signaling, the indication being automatically generated by the telephone switch;
    means for responding to the indication received at the service switching point to specify instructions for routing the telephone call; and
    means for routing the telephone call according to the specified routing instructions.

18. The invention of claim 17 wherein the means for responding comprises:
    means for sending the indication from the service switching point to a service control point;
    means for processing the telephone call at the service control point to specify the instructions for routing; and
    means for returning the instructions for routing from the service control point to the service switching point.

* * * * *